US008571353B2

(12) United States Patent
Watanabe

(10) Patent No.: US 8,571,353 B2
(45) Date of Patent: Oct. 29, 2013

(54) APPARATUS AND METHOD FOR IMAGE PROCESSING

(75) Inventor: Shinji Watanabe, Tokyo (JP)

(73) Assignee: Sony Corporation (JP)

( * ) Notice: Subject to any disclaimer, the term of this patent is extended or adjusted under 35 U.S.C. 154(b) by 235 days.

(21) Appl. No.: 13/177,728

(22) Filed: Jul. 7, 2011

(65) Prior Publication Data

US 2012/0014608 A1    Jan. 19, 2012

(30) Foreign Application Priority Data

Jul. 15, 2010   (JP) ............................... P2010-160558

(51) Int. Cl.
*G06K 9/32*    (2006.01)
(52) U.S. Cl.
USPC ........................................................ 382/298
(58) Field of Classification Search
USPC ............. 345/563, 626; 348/841; 375/E7.182; 382/212, 213, 283, 298
See application file for complete search history.

(56) References Cited

FOREIGN PATENT DOCUMENTS

| JP | 2009-175040 A |   | 8/2009 |
|----|---------------|---|--------|
| JP | 2009175040 A  | * | 8/2009 |

* cited by examiner

*Primary Examiner* — Gregory F Cunningham
(74) *Attorney, Agent, or Firm* — Lerner, David, Littenberg, Krumholz & Mentlik, LLP

(57) ABSTRACT

An image processing apparatus includes: a reducing section reducing an image for which a feature analysis is to be perform at a predetermined reduction ratio; an ROI mask generating section analyzing a feature of a reduced image as the image reduced at the predetermined reduction ratio, and generating an ROI mask as mask information indicating a region of interest as a region to be interested in the reduced image; an ROI mask enlarging section enlarging a size of the ROI mask to a size of the image before being reduced by the reducing section; and an ROI mask updating section analyzing a feature of a region, set as a blank region as a region not to be interested in the ROI mask, of the image before being reduced by the reducing section, and updating the ROI mask by using an analysis result.

10 Claims, 16 Drawing Sheets

ORIGINAL
IMAGE
PROCESSING

REDUCED
IMAGE
PROCESSING

REDUCED IMAGE (64×64)
AND L1 MASK (8×8)

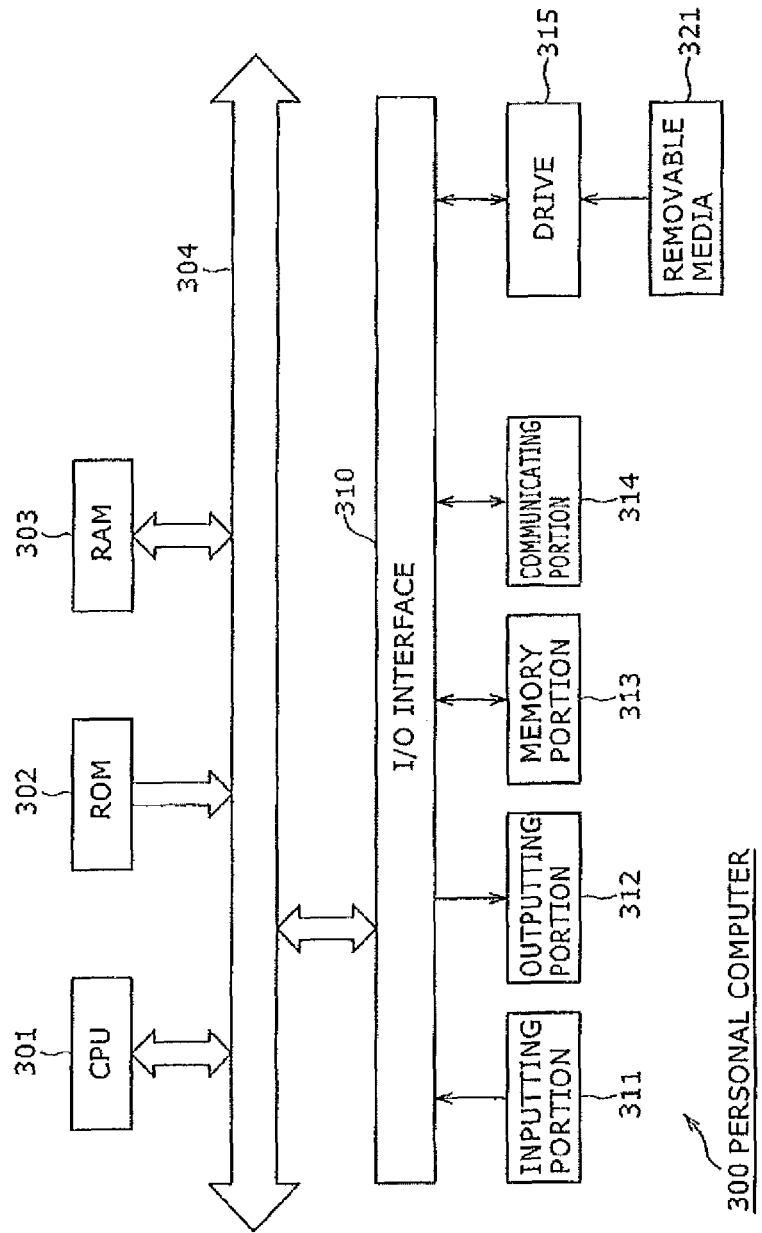

APPARATUS AND METHOD FOR IMAGE PROCESSING

CROSS-REFERENCE TO RELATED APPLICATION

The present application claims priority from Japanese Patent Application No. JP 2010-160558 filed in the Japanese Patent Office on Jul. 15, 2010, the entire content of which is incorporated herein by reference.

BACKGROUND OF THE INVENTION

The present disclosure relates to an apparatus and method for image processing. In particular, the disclosure relates to an apparatus and method for image processing by which a feature analysis of an image is allowed to be more readily carried out.

An application range of a pathology diagnosis by a Digital Pathology Imaging (DPI) system has spread to a cell diagnosis as well in addition to a past tissue diagnosis.

The tissue diagnosis is a method in which in an inspection, an operation or the like, a site of involvement, for example, is cut out by using a surgical knife to be harvested, and the site of involvement is then thinly sliced and stained to be observed by using a microscope. In the tissue diagnosis, in general, cells are observed as a set, and it, for example, is diagnosed whether or not the cell group has an abnormality in a size, a shape, an arrangement pattern, and the like of the cells, or whether or not a cell which is essentially absent exists in the cell group.

On the other hand, the cell diagnosis is a method in which a cell (sputum cytodiagnosis) which has fallen off by itself, a cell (exfoliative cytodiagnosis) which has been peeled off, a cell (aspiration cytology) which has been aspirated through needle prick or the like is stained and is then observed by using a microscope. In the cell diagnosis, in general, a less number of cells are observed, thereby diagnosing whether or not there is an abnormality in each of the cells, a size, a shape, etc. of a nucleus of each of the cell.

In the DPI system, images of the tissues and the cells (observation images obtained through the microscope) are managed in the form of digital data. For this reason, various pieces of image processing can be suitably subjected to the observation images (i.e., digital data) in accordance with a use application or the like.

A feature analysis about an image like detection of a Region Of Interest (ROI) is known as one of the various pieces of image processing. In this case, by analyzing the features of the image, the analysis result can be utilized in other various pieces of image processing and other various diagnosises.

For example, a method was devised in which in the tissue diagnosis, the ROI detection based on edge detection was carried out for the observation image, and confluency of the cells was calculated from the detection result, thereby specifying a carcinoma cell. This method, for example, is disclosed in Japanese Patent Laid-Open No. 2009-175040.

On the other hand, in the case of the cell diagnosis, in general, a large number of regions (blank regions), unnecessary for the observation, in which no cell is present exist in an image of the cells observed as compared with the case of the tissue diagnosis in many cases.

In addition, in the case of the cell diagnosis, the observation object is not a cut surface of the tissue unlike the tissue diagnosis. Therefore, for example, the cells overlap one another and the cells are different in size from one another in some cases. In a word, a focal point position in a depth direction differs every portion within the observation area in some cases. In order to cope with such a situation, in the case of the cell diagnosis, focal point position control in the depth direction which is referred to as so-called Z stack and plural observation images which are different from one another in the focal point position in the depth direction are generated in some cases.

As has been described, the observation image in the cell diagnosis has the features different from those in the tissue diagnosis in many cases. Therefore, the feature analysis which is suitable for the features of the observation image for the cell diagnosis is preferably carried out for the observation image for the cell diagnosis.

SUMMARY OF THE INVENTION

However, a method of carrying out the feature analysis for the features of the observation image for the cell diagnosis by utilizing a suitable method is not yet devised until now. As a result, a load for the analysis processing is unnecessarily increased, and so forth. Thus, there is the possibility that it may be impossible to efficiently carry out the feature analysis for the image.

The present disclosure has been made in order to solve the problems described above, and it is therefore desirable to provide an apparatus and method for image processing by which a feature analysis of an image is allowed to be more readily carried out.

In order to attain the desire described above, according to an embodiment of the present disclosure, there is provided an image processing apparatus including: a reducing section reducing an image for which a feature analysis is to be carried out at a predetermined reduction ratio; an ROI mask generating section analyzing a feature of a reduced image as the image reduced at the predetermined reduction ratio by the reducing section, and generating an ROI mask as mask information indicating a region of interest as a region to be interested in the reduced image; an ROI mask enlarging section enlarging a size of the ROI mask generated by the ROI mask generating section to a size of the image before being reduced at the predetermined reduction ratio by the reducing section; and an ROI mask updating section analyzing a feature of a region, set as a blank region as a region not to be interested in the ROI mask, of the image before being reduced at the predetermined reduction ratio by the reducing section, and updating the ROI mask by using an analysis result; ROI standing for region of interest.

In the embodiment of the present disclosure, the image for which the feature analysis is to be carried out is reduced at the predetermined reduction ratio. The feature of the reduced image as the image reduced at the predetermined reduction ratio is analyzed, and the Region-Of-Interest (ROI) mask as the mask information indicating the region of interest as the region to be interested in the reduced image is generated. The size of the ROI mask thus generated is enlarged to the size of the image before being reduced at the predetermined reduction ratio. Also, the feature of the region set as the blank region as the region not to be interested in the ROI mask of the image before being reduced at the predetermined reduction ratio is analyzed, and the ROI mask is updated by using the analysis result.

According to another embodiment of the present disclosure, there is provided an image processing method for use in an image processing method including: reducing an image for which a feature analysis is to be carried out at a predetermined reduction ratio by a reducing section; analyzing a feature of a reduced image as the image reduced at the predetermined reduction ratio by the reducing section, and generating an ROI mask as mask information indicating a region of interest as a region to be interested in the reduced image by an ROI mask generating section; enlarging a size of the ROI mask generated by the ROI mask generating section to a size of the image before being reduced at the predetermined reduction ratio by an ROI mask enlarging section; and analyzing a feature of a region, set as a blank region as an area not to be interested in the ROI mask, of the image before being reduced at the predetermined reduction ratio, and updating the ROI mask by using an analysis result by an ROI mask updating section; ROI standing for region of interest.

As set forth hereinabove, according to an embodiment of the present disclosure, the image can be processed. In particular, the feature of the image can be more readily analyzed.

BRIEF DESCRIPTION OF THE DRAWINGS

FIG. 17 is a block diagram showing a main configuration of a personal computer to which the present disclosure is applied.

DETAILED DESCRIPTION OF THE PREFERRED EMBODIMENTS

An embodiment of the present disclosure will be described in detail hereinafter with reference to the accompanying drawings. It is noted that the description will be given below in accordance with the following order:
1. ROI Detecting Apparatus (Embodiment); and
2. Personal Computer (Application Example).

1. Embodiment

ROI Detecting Apparatus

Figure 1:
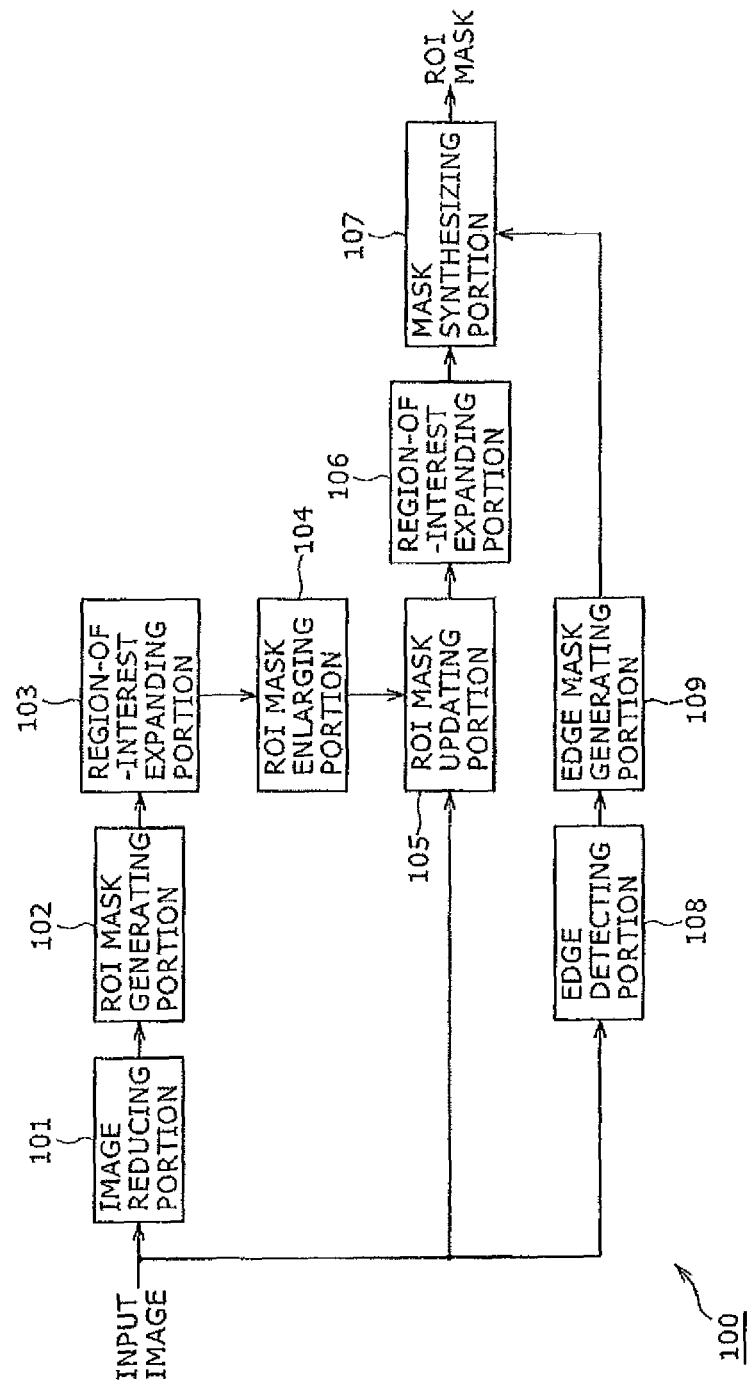
FIG. 1 is a block diagram showing a main configuration of an ROI detecting apparatus according to an embodiment of the present disclosure.

FIG. 1 is a block diagram showing a main configuration of a Region-Of-Interest (ROI) detecting apparatus as an image processing apparatus according to an embodiment of the present disclosure. The ROI detecting apparatus 100 analyzes features of an input image. In addition, the ROI detecting apparatus 100 classifies a region within the input image into partial regions in accordance with the features of the region and based on the analysis result. Specifically, the ROI detecting apparatus 100 analyzes the features of the input image every predetermined partial region, and classifies the partial regions into sub-partial regions in accordance with the features of the partial regions. More specifically, the ROI detecting apparatus 100 generates mask information as information for which the partial regions within the input image is classified into partial regions in accordance with the features of the image.

The ROI detecting apparatus 100, for example, detects a region of interest indicating a portion to be interested of the input image through such an image analysis. In a word, the ROI detecting apparatus 100 generates the mask information specifying the region of interest within the input image. In addition, the ROI detecting apparatus 100, for example, detects a blank region indicating a portion not to be interested within the input image. In a word, the ROI detecting apparatus 100 generates mask information specifying the blank region within the input image.

The mask information generated in such a manner by the ROI detecting apparatus 100 can be used in various pieces of image processing.

The ROI detecting apparatus 100 includes an image reducing portion 101, an ROI mask generating portion 102, a region-of-interest expanding portion 103, an ROI mask enlarging portion 104, and an ROI mask updating portion 105. Also, the ROI detecting apparatus 100 includes a region-of-interest expanding portion 106, a mask synthesizing portion 107, an edge detecting portion 108, and an edge mask generating portion 109.

[Outline of Hierarchy Type ROI Detection]

The ROI detecting apparatus 100 analyzes the features of the image as the processing object every partial region (block) having a predetermined size with the block as a processing unit. In a word, the ROI detecting apparatus 100 determines the degree of the interest every predetermined block, and, for example, determines whether or not the block is a Region-Of-Interest (ROI). In other words, the mask information generated by the ROI detecting apparatus 100 indicates the features of the image every block.

The ROI detecting apparatus 100 hierarchically analyzes the features of the input image in plural image sizes. For example, the ROI detecting apparatus 100 reduces the input image to generate a reduced image, and carries out the feature analysises for the reduced image and the original image (the input image not reduced), correspondingly. Also, the ROI detecting apparatus 100 generates the mask information by using both the analysis results.

Figure 2:
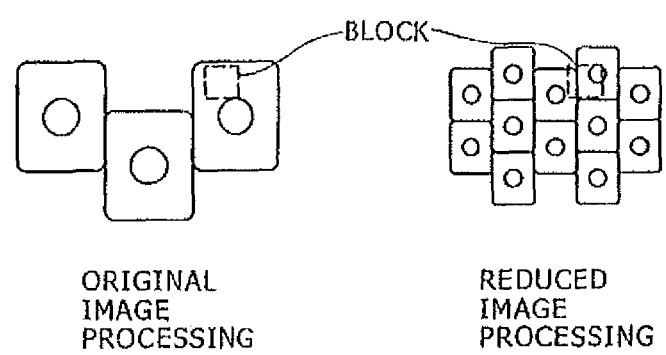
FIG. 2 is a diagram explaining a difference in processing object block between an original image and a reduced image.

At this time, the ROI detecting apparatus 100 analyzes the features of the input image having image sizes every plural blocks having the same size. Therefore, as shown in FIG. 2, a range of the image contained in one block differs every image size. An example of the block in the original image is shown on a left-hand side of FIG. 2, and an example of the block in the reduced image is shown on a right-hand side of FIG. 2. Although the sizes of the blocks of the right-hand and left-hand side examples are equal to each other, the range of the image contained therein is wider in the reduced image than in the original image.

The ROI detecting apparatus 100 analyzes the features over plural ranges in such a manner, thereby making it possible to suppress mal-detection and detection omission of the region of interest.

For example, when the input image is an observation image obtained from a cell diagnosis, in general, a portion in which the cells collectively exists, and a portion in which any of the cells does not exist are present in the region within the input image. In the cell diagnosis, the cell becomes an observation object. Therefore, in the observation image obtained from the cell diagnosis, in general, a portion in which the cell exists becomes the Region-Of-Interest (ROI), and a portion in which any of the cells does not exist becomes the blank region.

The ROI detecting apparatus 100 obtains a value of a dispersion of pixel values every block, and determines whether or not a block concerned is a portion in which the cell exist (a region concerned is the region of interest) in accordance with the value of the dispersion, and so forth. In general, when the cell exists in the block, various components are easy to generate and the dispersion of the pixel values becomes large. Contrary to this, when any of the cells does not exist in the block, a uniform image is obtained, and the dispersion of the pixel values becomes small.

However, when a Z stack is dealt with in the cell diagnosis, a size and a shape of the cell need to be stereoscopically grasped. Thus, plural images are generated while the focal point position is changed in the depth direction in some cases. Therefore, it is also thought that the image of the block as the processing object is not brought to a focus in some cases. When the focal point is missed, the image is defocused and thus an edge component becomes easy to weaken. Therefore, in general, a method using the dispersion of the pixel values of the entire block is stronger in missing of the focal point than a method using the edge detection, and thus it is possible to precisely determine presence or absence of the cell in the block. However, since the dispersion becomes smaller when the focal point is largely missed, there is the possibility that the detection omission of the cell is caused.

In addition, it is also thought that as shown on the left-hand side of FIG. 2, the block is located in a flat portion within the cell in terms of the structure of the cell. In such a case, it is also thought that the pixel values become uniform to reduce the dispersion, and thus the block concerned is specified as the blank region.

When the detection omission and mal-detection of the region of interest is caused, there is the possibility that the detection omission and mal-detection of the region of interest exerts a bad influence on the image processing utilizing the mask information on the region of interest. For example, in the case where only the blank region of the input image is compressed in accordance with the mask information, there is the possibility that when a portion to be essentially set as the region of interest (for example, the cell or the like) is set as the blank region in the mask information due to the detection omission, the portion is compressed to reduce the image quality.

On the other hand, in the case of the reduced image, since as shown on the right-hand side of FIG. 2, the range of the image contained in the block is wider in the reduced image than in the original image, the possibility that the edge portion or the like of the cell is contained becomes large. In addition, the range of the image contained in the block spreads, whereby in general, the dispersion of the pixel values becomes easy to be large.

However, when the portion, in which any of the cells does not exist, within the block becomes wide due to the image reduction, it is also thought that the dispersion of the pixel values in that block is reduced, and thus that portion is set as the blank region.

Therefore, the ROI detecting apparatus 100, as described above, carries out the feature analysis in the plural hierarchy type manner. For example, the ROI detecting apparatus 100 carries out the feature analysises for the reduced image and the original image, correspondingly, and generates the mask information in accordance with the both analysis results. As a result, the ROI detecting apparatus 100 can suppress the generation of the detection omission and mal-detection of the region of interest as compared with the case where only the original image or only the reduced image is used.

In other words, the ROI detecting apparatus 100 can more readily carry out the more precise feature analysis without requiring the complicated processing or the advanced analysis processing by only carrying out the feature analysis in the plural hierarchy type manner.

[Input Image]

The input image inputted to the ROI detecting apparatus 100 is a Y plane (luminance component) of YUV. It is noted that the input image may be obtained by carrying out gray scale-transformation for RGB. In addition, when in dispersion processing which will be described later, a U plane and a V plane (color difference components) of YUV are also used, the cell (region of interest) can be more safely detected.

Hereinafter, the portions of the ROI detecting apparatus 100 shown in FIG. 1 will be described in more detail.

[Image Reducing Portion]

Firstly, the image reducing portion 101 will be described. The image reducing portion 101 reduces the input image at a predetermined reduction rate to generate the reduced image (Down sample). For example, the image reducing portion 101 reduces the input image to one-fourth in height and width for first hierarchy processing in the hierarchy type ROI detection. The reduction ratio of the input image is desirably changed depending on a magnification of a level of an electron microscope, a size of an observation object (such as a cell), and the like.

A method of reducing the input image is arbitrary. For example, a two-dimensional reduction filter or a two-dimensional average filter may also be used. The former is a highly precise and low-speed filter. Also, although the latter is inferior in precision to the former, the latter is a high-speed filter. In addition, the pixels may also be merely thinned.

The image reducing portion 101 supplies information on the reduced image thus generated to the ROI mask generating portion 102.

[ROI Mask Generating Portion]

Figure 3:
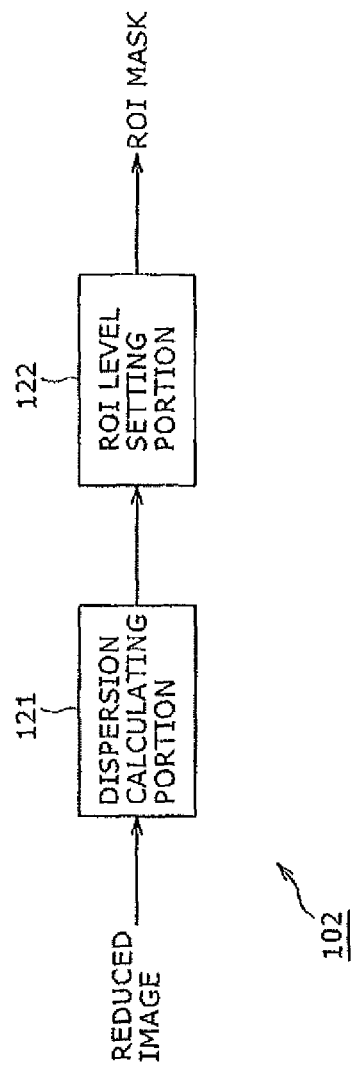
FIG. 3 is a block diagram showing a main configuration of an ROI mask generating portion shown in FIG. 1.

The ROI mask generating portion 102 analyzes the features of the reduced image inputted thereto and generates the mask information (ROI mask) indicating the region of interest in the reduced image. FIG. 3 is a block diagram showing a main configuration of the ROI mask generating portion 102. As shown in FIG. 3, the ROI mask generating portion 102 includes a dispersion calculating portion 121 and an ROI level setting portion 122.

The dispersion calculating portion 121 obtains a value of a dispersion of pixel values every block of pixels of N×N (N: an arbitrary natural number) for the reduced image inputted thereto. The dispersion $V(X)$ of the pixel values is calculated from Expression (1):

$$V(X) = E(X^2) - (E(X))^2 \qquad (1)$$

where E(X) stands for an expected value.

Figure 4:
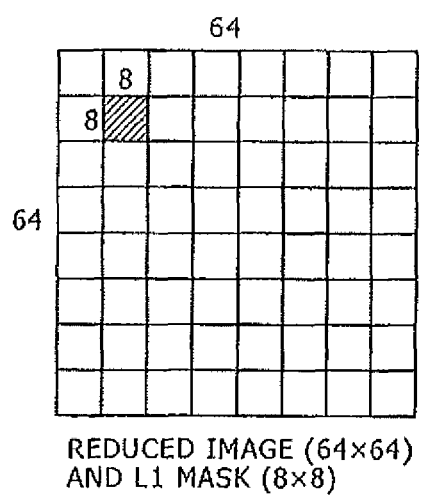
FIG. 4 is a diagram explaining a block size in a reduced image.

For example, when the reduced image is obtained from the pixels of 64×64, and the block is obtained from the pixels of 8×8, as shown in FIG. 4, the reduced image is divided into 64 blocks. In this case, the dispersion calculating portion 121 calculates values of the 64 dispersions V(X) for the reduced image.

It is noted that the block size (of N×N) is arbitrary. However, when the mask information used in compression processing complying with either a Joint Photographic Experts Group (JPEG) or a Moving Picture Experts Group (MPEG), the block size is set as a size fitted to the compression processing block, whereby an arithmetic operation during the compression processing becomes easy.

The dispersion calculating portion 121 supplies the value of the dispersion V(X) of the blocks thus calculated to the ROI level setting portion 122. At this time, the dispersions V(X), and the regions (for example, the blocks) corresponding to the dispersions V(X) are clearly specified. A method for the clearly specifying is arbitrary.

For example, an arrangement order in which the pixels of the reduced image are arranged in a predetermined order may be previously set, and the values of the dispersions V(X) corresponding to the pixels may be supplied in the arrangement order to the ROI level setting portion 122. This operation may not be carried out in pixels, but may be carried out in blocks. It is to be understood that this operation may also be carried out in other units.

The ROI level setting portion 122 sets ROI levels indicating kinds of regions (degrees of interest) in the blocks, correspondingly, in accordance with the value of the dispersion V(X) supplied thereto from the dispersion calculating portion 121.

For example, the ROI level setting portion 122 sets the ROI level of the block having the dispersion V(X)=0 in "the blank region." In addition, the ROI level setting portion 122 sets the ROI level of the block having the dispersion V(X)=1 in "the cell region Level Low," and sets the ROI level of the block having the dispersion V(X)=2 or more in "the cell region."

The ROI level set as "the blank region" indicates that the region concerned is the region (blank region) not to be interested. In a word, the ROI level set as "the blank region" indicates that the region concerned is the region in which the cell does not exist.

The ROI level set as "the cell region" indicates that the region concerned is the region (region of interest) to be interested. In a word, it is indicated that the region concerned is the region in which the cell exists by the ROI level set as "the cell region."

The ROI level set as "the cell region Level Low" indicates that the region concerned is one of the regions of interest. However, the ROI level set as "the cell region Level Low" is distinguished from the ROI level set as "the cell region."

In this case, the value of the dispersion V(X) of the pixel values is obtained by using the reduced image. Therefore, a threshold value for the dispersion V(X) is set in consideration of that a camera noise contained in the blank region and a noise of a stain solution are both removed.

In the block having the dispersion V(X)=1, the possibility that the image of the cell is contained is not zero although the possibility that the image of the cell is contained is low. Therefore, for the sake of safety (for the purpose of suppressing the detection omission of the region of interest), the block having the dispersion V(X)=1 is set as the region of interest. However, this portion is set to the ROI level set as "the cell region Level Low" different from the ROI level set as "the cell region" of the block having the dispersion V(X)=2 or more so as to allow the optimal processing to be executed in accordance with a processing use application.

For example, it is assumed that the mask information is used in quantization processing of encoding processing, and a quantization parameter is set in accordance with the ROI level. In this case, the ROI levels are separated to keep the block having the dispersion V(X)=1 from the block having the dispersion V(X)=2 or more, thereby making it possible to set the quantization parameter of the block having the dispersion V(X)=1 lower than that of the block having the dispersion V(X)=2 or more. As a result, the efficiency of the encoding of the image data can be enhanced while a visual influence is suppressed.

When the ROI level is set in accordance with the value of the dispersion V(X) in such a manner, the ROI level setting portion 122 supplies predetermined pieces of information on the ROI levels as the mask information (ROI mask) indicating the ROI levels of the respective blocks to the region-of-interest expanding portion 103.

The ROI mask is the predetermined pieces of information indicating the ROI levels of the pixels of the reduced image. In other words, the ROI mask is the predetermined pieces of information indicating the regions of the ROI levels in the reduced image.

[Region-Of-Interest Expanding Portion]

The region-of-interest expanding portion 103 expands the range of the region of interest in the ROI mask supplied thereto in accordance with a predetermined rule. This is processing for preventing a portion to be essentially set as the region of interest (for example, the block in which the image of the cell is contained) from being set as the blank region, that is, processing for suppressing the detection omission of the region of interest.

Figure 5:
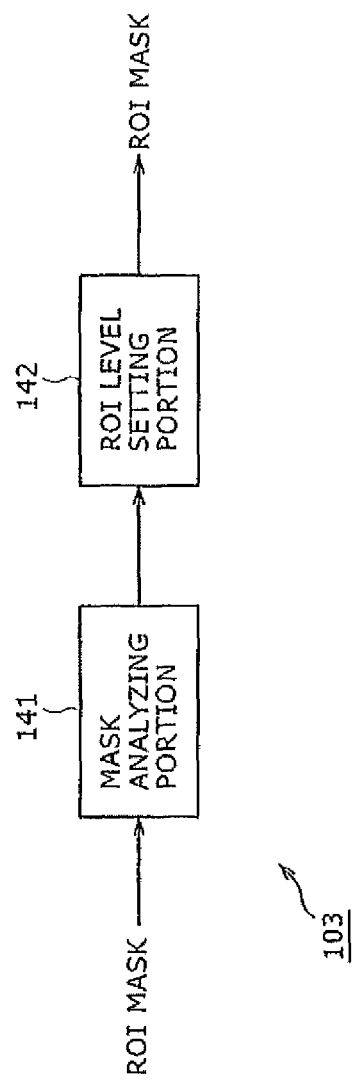
FIG. 5 is a block diagram showing a main configuration of a mask region expanding portion shown in FIG. 1.

FIG. 5 is a block diagram showing a main configuration of the region-of-interest expanding portion 103. As shown in FIG. 5, the region-of-interest expanding portion 103 includes a mask analyzing portion 141 and an ROI level setting portion 142.

Figure 6:
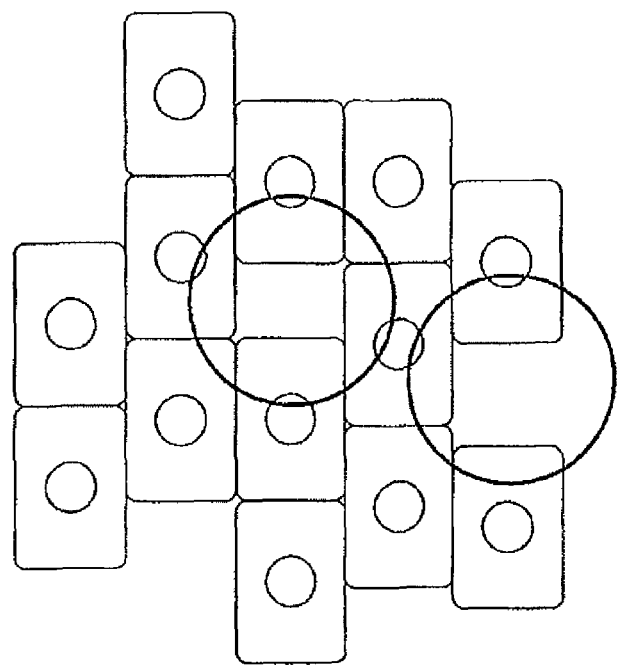
FIG. 6 is a diagram explaining an example of a pattern of an image set as a protection region.

The mask analyzing portion 141 specifies the region to be expanded. For example, like portions surrounded by circles shown in FIG. 6, even in a portion in which the cells are aggregated in the observation image of the cell diagnosis, a space is caused among the cells in some cases. It is also thought that the ROI mask generating portion 102 sets such a region as the blank region depending on the positions of the blocks. However, the possibility that the region in which the cells are close to one another contains therein the information to be observed is high, and thus such a region is set as the region of interest in many cases.

For the sake of safety (for the purpose of suppressing the detection omission of the region of interest), the region-of-interest expanding portion 103 expands the region of interest to prevent such a portion from being set as the blank region. For this reason, the mask analyzing portion 141 specifies such a portion.

An expanding method is arbitrary. For example, the region in which it is determined that the cell exists in the ROI mask may be uniformly expanded. For example, the mask analyzing portion 141 analyzes the ROI mask to specify the block, of the blank region, adjacent to the block set as the region of interest as a processing object block. At this time, the block which is close to the block set as the region of interest and which is not adjacent to the region of interest may also be contained in the processing object block. In addition, of the region of interest, only the block of the ROI level set as "the cell region" may be expanded.

In addition, for example, the region in which it is determined that the cell does not exist in the ROI mask may be reviewed depending on the situations of the regions in the circumference of that region. For example, when the mask analyzing portion 141 determines that many blocks each set as the region of interest (or the cell region) exist in the circumference of the block set as the blank region by analyzing a region distribution pattern of the ROI mask, the mask analyzing portion 141 specifies the block set as the blank region as the processing object block. A rate, (or the number) of the blocks of the region of interest (or the cell region) in the circumference of the processing object block, which is used as a reference (threshold value) as to whether or not the block concerned is set as the processing object block is arbitrary.

The former is utilized when the region of interest is desired to be more safely obtained. On the other hand, the latter is utilized when the blank region is desired to be positively extracted.

Figure 7:
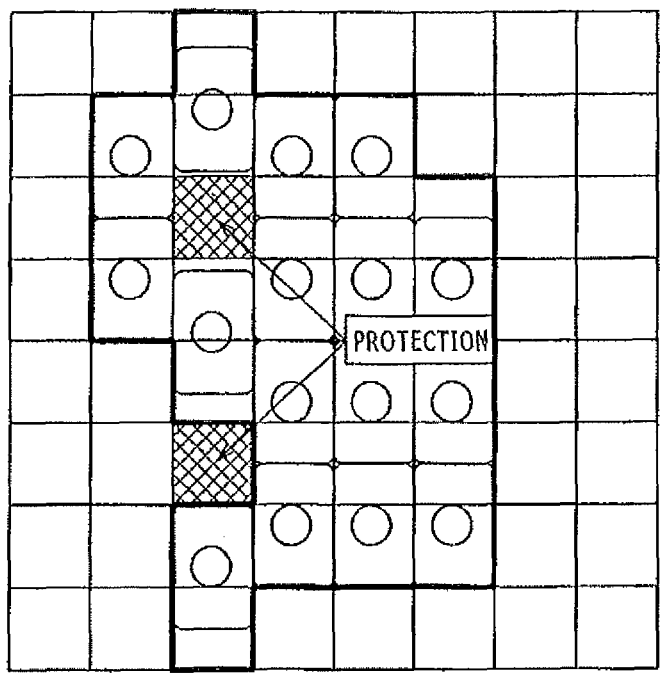
FIG. 7 is a diagram explaining an example of a situation of setting of the protection region.

The mask analyzing portion 141 supplies the analysis result together with the ROI mask to the ROI level setting portion 142. For example, as shown in FIG. 7, the ROI level setting portion 142 sets the ROI level of the specified processing object block as "a protection region." The ROI level set as "the protection region" indicates that the region concerned is one of the regions of interest. However, the ROI level set as "the protection region" is distinguished from the ROI level set as "the cell region" and the ROI level set as "the cell region Level Low."

The ROI level setting portion 142 sets the processing object block as the ROI level different from "the cell region" and "the cell region Level Low" of the block in which it is determined that the cell exists so as to allow the optimal processing to be executed in accordance with the processing use application.

When the region of interest has been expanded in the manner as described above, the ROI level setting portion 142 supplies the ROI mask to the ROI mask enlarging portion 104.

It is noted that the region-of-interest expanding portion 103 can be omitted. In this case, the ROI mask generated by the ROI mask generating portion 102 is supplied to the ROI mask enlarging portion 104.

[ROI Mask Enlarging Portion]

The ROI mask enlarging portion 104 enlarges the ROI mask. The ROI mask which is intended to be supplied to the ROI mask enlarging portion 104 is created in accordance with the input image having the image size in a first hierarchy. Therefore, the ROI mask enlarging portion 104 transforms the size of the ROI mask in such a way that the ROI mask can be used in processing in a second hierarchy.

More specifically, the ROI mask enlarging portion 104 up-samples the ROI mask created in accordance with the reduced image, so that the size of the ROI mask is returned back to the size of the original image (Up sample). In a word, the ROI mask enlarging portion 104 enlarges the ROI mask at an enlargement ratio corresponding to the reduction ratio in the phase of the reduction of the input image in the image reducing portion 101, thereby obtaining the mask information indicating the region of interest of the original image (the input image before reduction).

Figure 8:
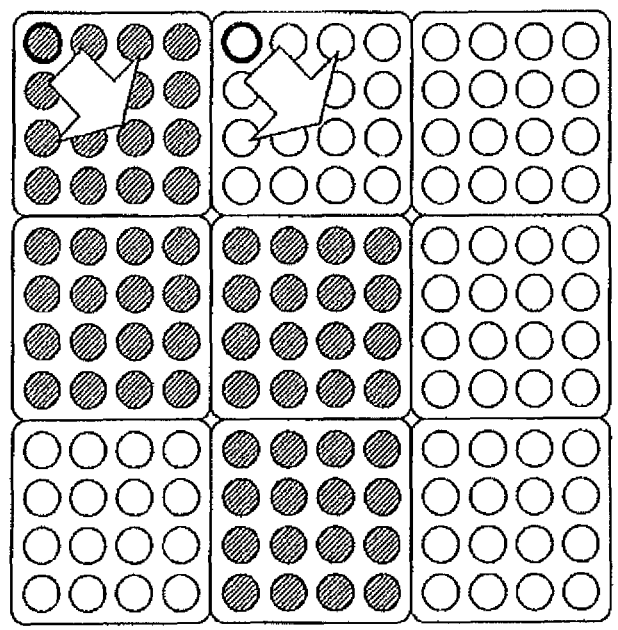
FIG. 8 is a diagram explaining an example of a situation of expansion of a mask.

An enlarging method is arbitrary. For example, as shown in FIG. 8, the number of pixels in the ROI mask may be enlarged at the reduction ratio in the phase of the reduction of the input image in the pixel reducing portion 101. For example, when the input image was reduced to one-fourth in height and width in the image reducing portion 101, the ROI mask enlarging portion 104 copies one pixel in the ROI mask into four pixels in height and width (16 pixels in total). In this case, since a value of the pixel in the ROI mask shows the ROI level, it is only necessary to simply carry out the copy (changing the pixel value is not basically preferable because the ROI level is necessarily changed).

In FIG. 8, each of circles surrounded by quadrilaterals each having four rounded corners indicates the pixel of the ROI mask. Also, a shaded circle indicates the region of interest, and an open circle indicates the blank region. The ROI mask enlarging portion 104 copies the pixel in the left upper end within the quadrilateral having the four rounded corners into the four pixels in height and width to generate 16 pixels within the quadrilateral having the four rounded corners. In a word, the regions each having the same ROI level are enlarged four times in height and width.

It is noted that since the block size is common to the hierarchies, the block size of N×N is held as it is. In addition, the copy as described above may not be carried out in pixels, but may be carried out in blocks. The ROI mask enlarging portion 104 supplies the ROI mask in which the pixel size is enlarged to the ROI mask updating portion 105.

[ROI Mask Updating Portion]

The ROI mask updating portion 105 further corrects the blank region of the ROI mask supplied thereto from the ROI mask enlarging portion 104 by using the original image (the input image in which the image size is not changed) in order to suppress the detection omission of the region of interest.

Figure 9:
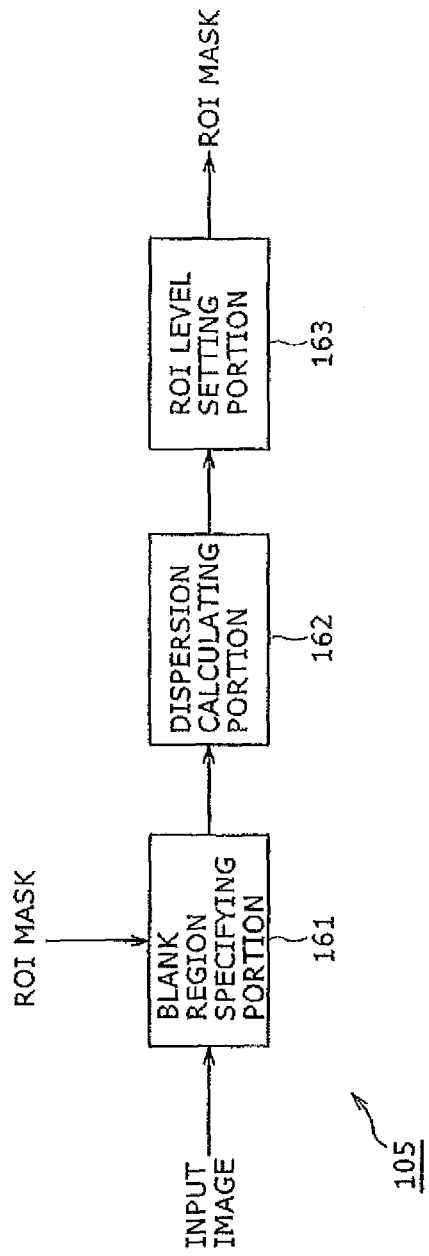
FIG. 9 is a block diagram showing a main configuration of an ROI mask updating portion shown in FIG. 1.

FIG. 9 is a block diagram showing a main configuration of the ROI mask updating portion 105. As shown in FIG. 9, the ROI mask updating portion 105 includes a blank region specifying portion 161, a dispersion calculating portion 162, and an ROI level setting portion 163.

The blank region specifying portion 161 specifies a portion of the blank region in the input image (original image) in accordance with the ROI mask having the size enlarged to the size of the original image. Also, the blank region specifying portion 161 supplied both the ROI mask and the portion of the blank region in the input image to the dispersion calculating portion 162.

Figure 10:
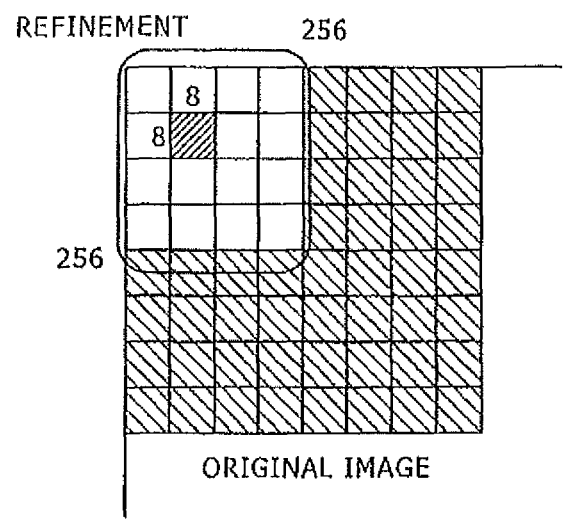
FIG. 10 is a diagram explaining a situation of updating of the mask.

The dispersion calculating portion 162 obtains a value of a dispersion every block in the portion of the blank region in the input image supplied thereto. In a word, for example, as shown in FIG. 10, the dispersion calculating portion 162 obtains the value of the dispersion only with respect to the blocks each specified as the blank region of the input image (obtains the value of the dispersion in pixels of N×N). The detection omission caused by the reduction processing can be suppressed in the dispersion calculating portion 162. The dispersion calculating portion 162 supplies both values of the dispersions thus calculated, and the ROI mask to the ROI level setting portion 163.

The ROI level setting portion 163 resets the ROI level of the blank region in the ROI mask in accordance with the values of the dispersions thus calculated.

For example, the ROI level setting portion 122 sets each of the ROI level of the block having the dispersion V(X)=0, and the ROI level of the block having the dispersion V(X)=1 as "the blank region." In addition, for example, the ROI level setting portion 122 sets the ROI level of the black having the dispersion V(X)=2 or more as "the cell region."

Since the dispersions are obtained by using the original image, a lot of noise exists in the blank region as well. Thus, the possibility that each of the dispersions is calculated so as to be comparatively high due to a lot of noise is high. In order to cope with this situation, the ROI level setting portion 122 sets the ROI level as well of the block having the dispersion of V(X)=1 as "the blank region" in order to suppress the maldetection caused by such noise components.

When the ROI level of the blank region in the ROI mask is reset in the manner as described above, the ROI level setting portion 163 supplies the updated ROI mask to the region-of-interest expanding portion 106.

[Region-Of-Interest Expanding Portion]

The region-of-interest expanding portion 106 executes the same expansion processing as that in the region-of-interest expanding portion 103 for the updated ROI mask having the size of the original image to enlarge the range of the region of interest (or the cell region) in accordance with a predetermined rule. This processing is processing for preventing a portion to be essentially set as the region of interest (for example, the block in which the image of the cell is contained) from being set as the blank region, that is, processing for suppressing the detection omission of the region of interest.

The region-of-interest expanding portion 106 has the same configuration as that of the region-of-interest expanding portion 103, and executes the same processing as that in the region-of-interest expanding portion 103. Therefore, the description of the region-of-interest expanding portion 103 given with reference to FIGS. 5 and 6 can also apply to the description of the region-of-interest expanding portion 106.

When the region-of-interest expanding portion 106 has expanded the region of interest (or the cell region), the region-of-interest expanding portion 106 supplies the ROI mask to the mask synthesizing portion 107.

It is noted that the region-of-interest expanding portion 106 can be omitted similarly to the case of the region-of-interest expanding portion 103. In this case, the ROI mask which has been updated by the ROI mask updating portion 105 is supplied to the mask synthesizing portion 107.

[Edge Detecting Portion]

Now, the ROI detecting apparatus 100 shown in FIG. 1 carries out the region-of-interest detection based on the edge detection separately from the hierarchy type region-of-interest detection using the values of the dispersions V(X) of the pixel values. In general, in a cell nucleus or a nuclear body, an edge is continuous. Therefore, the region of interest can be more precisely specified in a method of detecting the continuous edge from the peripheral edge information based on the hysteresis, and using the edge detection result than in a method of utilizing the values of the dispersions V(X). However, as described above, the edge detection has a low tolerance for the missing of the focal point. Therefore, the ROI detecting apparatus 100 uses both the two methods at the same time. By adopting such a procedure, the ROI detecting apparatus 100 can more readily carry out the more precise detection of the region of interest without requiring any of complicated arithmetic operations.

The edge detecting portion 108 carries out the edge detection for the input image (original image). A Sobel filter is utilized for the edge detection, and an edge determination is carried out by using a Canny Edge Detector. Although a threshold of hysteresis of the Canny Edge Detector is arbitrary, the threshold thereof is preferably set to a value suitable for extracting an outline of a cell in a phase of focusing. For example, Low may be set to 50 and HIGH may be set to 100. The edge detecting portion 108 supplies the detection result to the edge mask generating portion 109.

[Edge Mask Generating Portion]

The edge mask generating portion 109 determines whether or not the edge is contained every block (having the pixels of N×N) in accordance with the edge detection result obtained from the edge detecting portion 108. Also, the edge mask generating portion 109 generates an edge mask as mask information in which the ROI level of the block having the edge contained therein is set as "the region of the most interest." The block size at this time is set identical to the block size of the ROI mask described above.

The ROI level set as "the region of the most interest" indicates that the region concerned is one of the regions of interest. The ROI level set as "the region of the most interest" has the higher level in degree of interest than any of "the cell region," "the cell region Level Low," and "the protection region" as other regions of interest. In a word, it is determined that the reliability of the presence of the cell is the highest in the region (block) in which the edge is detected.

Figure 11:
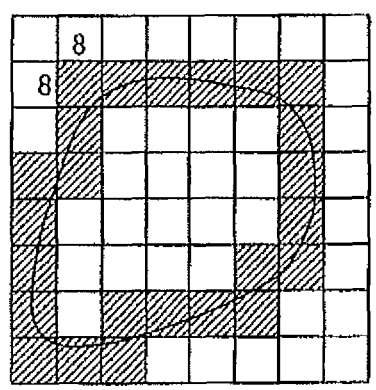
FIG. 11 is a diagram explaining an example of a situation of edge extraction.

FIG. 11 shows an example of the edge mask. In FIG. 11, a curve indicates the edge, and each of quadrilaterals indicates the block. Slant-patterned quadrilaterals including the curve is the block of the ROI level set as "the region of the most interest."

When the edge mask generating portion 109 has generated the edge mask indicating such an ROI level set as "the region of the most interest," the edge mask generating portion 109 supplies the edge mask thus generated to the mask synthesizing portion 107.

[Mask Synthesizing Portion]

Figure 12:
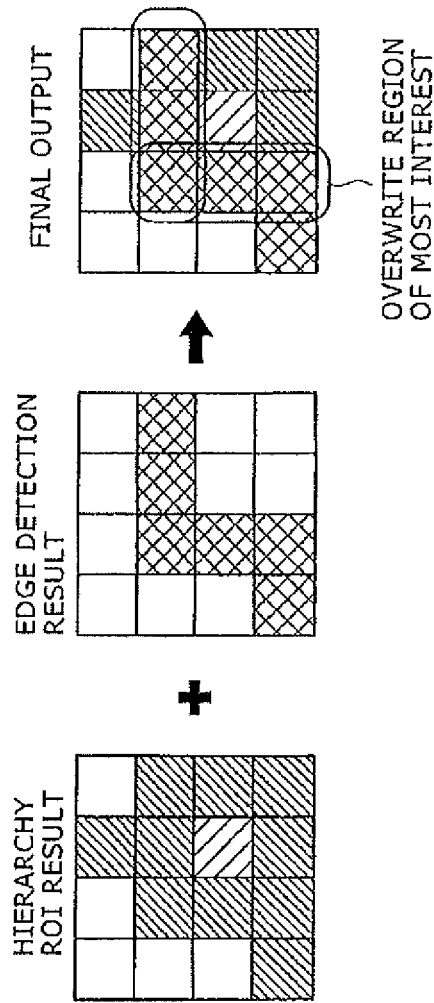
FIG. 12 is a diagram explaining an example of synthesis of the masks.

The mask synthesizing portion 107 synthesizes the ROI mask hierarchically detected and supplied thereto from the region-of-interest expanding portion 106 with the edge mask supplied thereto from the edge mask generating portion 109. In a word, for example, as shown in FIG. 12, the mask synthesizing portion 107 overwrites a distribution of the region of the most interest of the edge mask on a distribution of the region of interest of the ROI mask to reflect the distribution of the region of the most interest of the edge mask in the distribution of the region of interest of the ROI mask.

As described above, the ROI level set as "the region of the most interest" has the higher level in degree of interest than any of the ROI levels set as "the cell region," "the cell region Level Low," and "the protection region." Therefore, the mask synthesizing portion 107 prioritizes the ROI level set as "the region of the most interest" over any of the ROI levels set as "the cell region," "the cell region Level Low," and "the protection region." For example, when with regard to the same block, the ROI level set as "the cell region" is set in the ROI mask, and the ROI level set as "the region of the most interest" is set in the edge mask, the mask synthesizing portion 107 sets that block in the ROI level set as "the region of the most interest."

The mask synthesizing portion 107 outputs the synthesis result as the ROI mask.

[Flow of ROI Detection Processing]

Next, a description will be given with respect to a flow of processing which is executed by the ROI detecting apparatus 100. Firstly, a flow of ROI detection processing will be described with reference to a flow chart shown in FIG. 13.

When the information on the input image has been inputted to the ROI detecting apparatus 100, the ROI detecting apparatus 100 starts to execute the ROI detecting processing for generating the ROI mask of the input image.

When the ROI detecting processing has been started, in Step S101, the image reducing portion 101 reduces the input image at the predetermined reduction ratio. In Step S102, the ROI mask generating portion 102 generates the ROI mask by using the reduced image.

In Step S103, the region-of-interest expanding portion 103 executes the region-of-interest expanding processing to expand the region of interest of the ROI mask which has been generated in Step S102. The details of the region-of-interest expanding processing will be described later.

In Step S104, the ROI mask enlarging portion 104 enlarges the ROI mask. In Step S105, the ROI mask updating portion 105 updates the ROI mask by using the input image (original image).

In Step S106, the region-of-interest expanding portion 106 executes the region-of-interest expanding processing to expand the region of interest of the updated ROI mask. It is noted that since the region-of-interest expanding processing is executed similarly to the processing in Step S103, a detailed description thereof is omitted here for the sake of simplicity.

In Step S107, the edge detecting portion 108 detects the edge from the input image (original image). In Step S108, the edge mask generating portion 109 generates the edge mask by using the edge detection result obtained from the processing in Step S107.

In Step S109, the mask synthesizing portion 107 synthesizes the ROI mask in which the region of interest was enlarged in the processing in Step S106 with the edge mask generated in the processing in Step S108.

Figure 13:
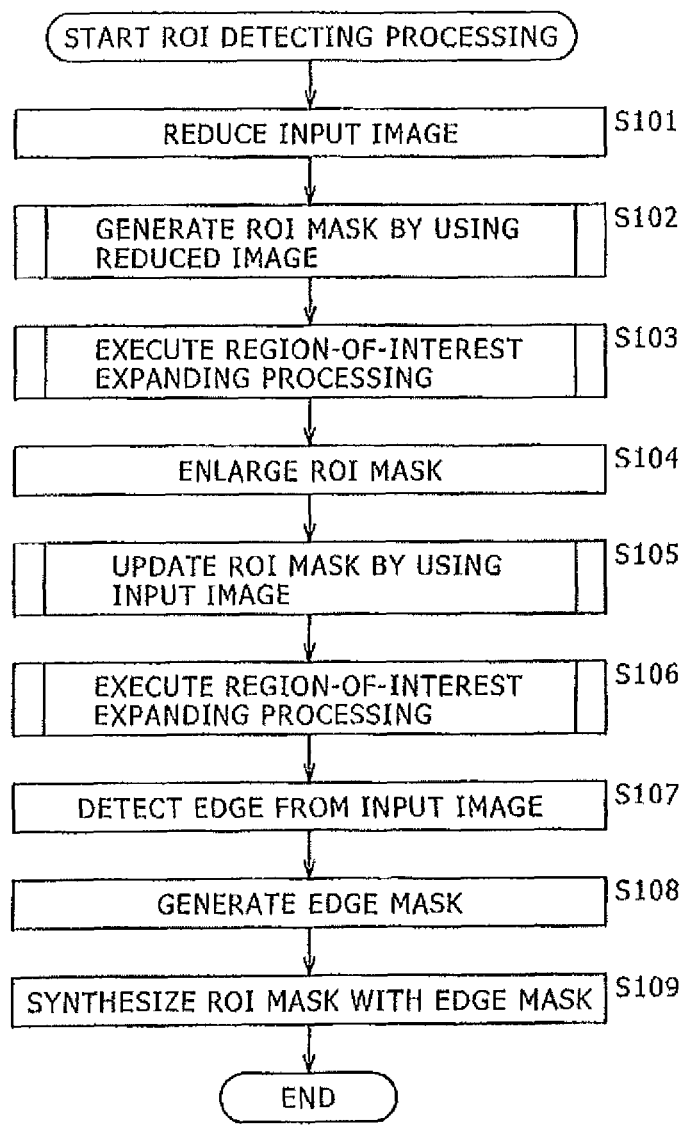
FIG. 13 is a flow chart explaining a flow of ROI detecting processing.

After the processing in Step S109 has been ended, the ROI detecting apparatus 100 outputs the ROI mask which has been synthesized with the edge mask in the processing in Step S109 as the ROI detection result, thereby ending the ROI detection processing shown in FIG. 13.

[Flow of ROI Mask Generating Processing]

Next, a description will be given with reference to a flow of the ROI mask generating processing executed in the processing in Step S102 of FIG. 13 with reference to a flow chart shown in FIG. 14.

When the ROI mask generating processing has been started, in Step S121, the dispersion calculating portion 121 calculates the value of the dispersion V(X) of the pixel values every predetermined partial region (block) with respect to the reduced image.

In Step S122, the ROI level setting portion 122 sets the ROI levels of the respective partial regions (blocks) in accordance with the values of the dispersions V(X) calculated in the processing in Step S121. When the ROI level setting portion 122 has set the ROI levels, the ROI level setting portion 122 outputs the ROI levels of the respective blocks as the ROI mask in Step S123.

Figure 14:
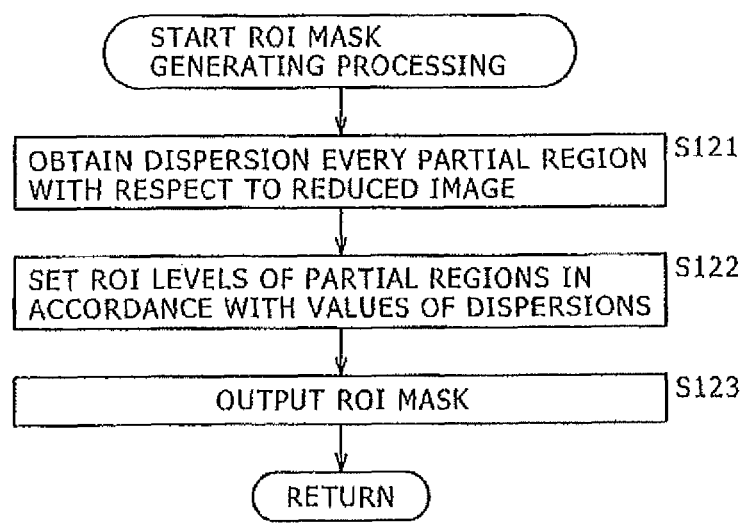
FIG. 14 is a flow chart explaining a flow of ROI mask generating processing.

When the processing in Step S123 has been ended, the ROI mask generating portion 102 ends the ROI mask generating processing shown in FIG. 14. Also, the operation of the ROI detecting apparatus 100 is returned back to the processing in Step S102 shown in FIG. 13, and the predetermined pieces of processing in and after the processing in Step S103 are executed.

[Flow of Region-Of-Interest Expanding Processing]

Next, a description will be given with respect to a flow of the region-of-interest expanding processing executed in the processing in Step S103 of FIG. 13 with reference to flow chart shown in FIG. 15.

When the region-of-interest expanding processing has been started, the mask analyzing portion 141 analyzes a pattern of the ROI level in the ROI mask in Step S141, and specifies the partial region having a predetermined circumferential pattern in Step S142. For example, the mask analyzing portion 141 specifies either the blocks in the circumference of the block set as the region of interest, or the block for which most of the circumferential blocks are each set as the region of interest.

In Step S143, the ROI level setting portion 142 sets the ROI level of the partial region specified in the processing in Step S142 as "the protection region."

Figure 15:
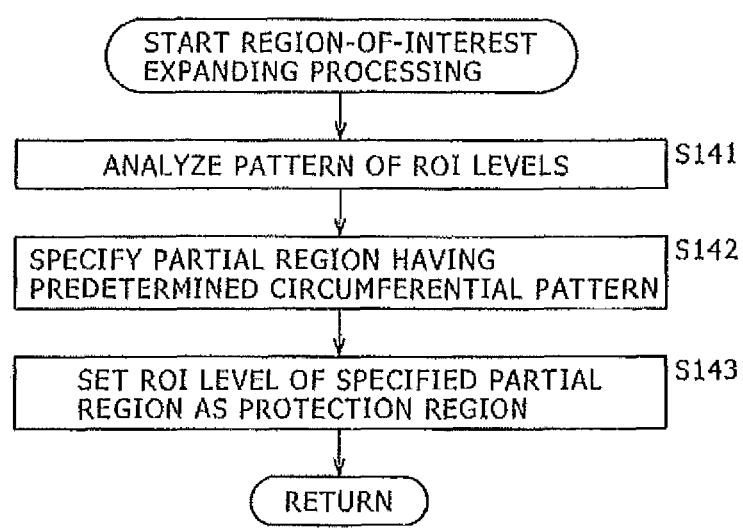
FIG. 15 is a flow chart explaining a flow of mask region expanding processing.

When the processing in Step S143 has been ended, the region-of-interest expanding portion 103 ends the region-of-interest expanding processing shown in FIG. 15. Also, the operation of the ROI detecting apparatus 100 is returned back to the processing in Step S103 shown in FIG. 13. Then, the predetermined pieces of processing in and after the processing in Step S104 are executed.

It is noted that in Step S106 shown in FIG. 13, the region-of-interest expanding portion 106 also executes the same region-of-interest expanding processing as that in the region-of-interest expanding portion 103.

[Flow of ROI Mask Updating Processing]

Next, a description will be given with respect to a flow of the ROI mask updating processing executed in the processing in Step S105 of FIG. 13 with reference to a flow chart shown in FIG. 16.

When the ROI mask updating processing has been started, in Step S161, the blank region specifying portion 161 specifies a partial region (block) corresponding to "the blank region" of the ROI mask.

In Step S162, the dispersion calculating portion 162 obtains the value of the dispersion V(X) of the pixel values with respect to the partial region (block) specified in Step S161.

In Step S163, the ROI level setting portion 163 sets the ROI level of the partial region in accordance with the value of the dispersion V(X) calculated in Step S162.

When the ROI mask has been updated in the manner as described above, the ROI level setting portion 163 outputs the updated ROI mask in Step S164.

Figure 16:
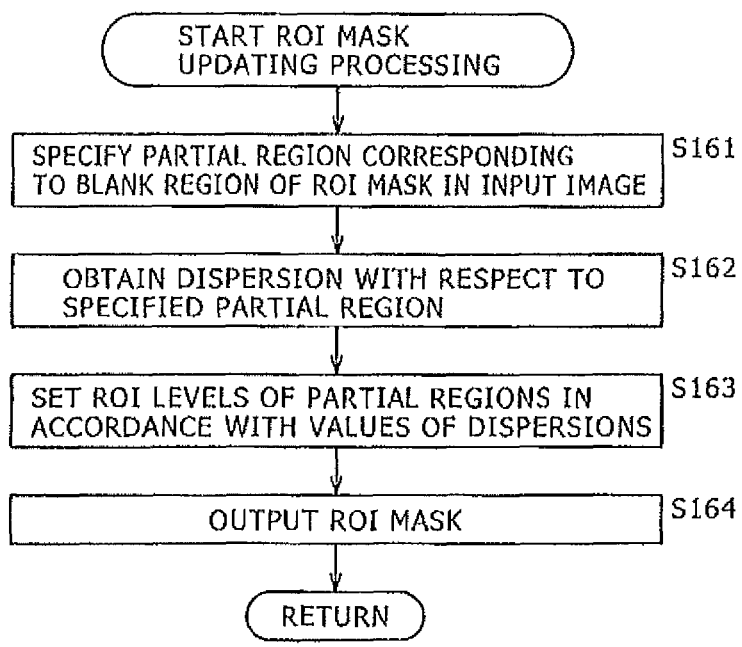
FIG. 16 is a flow chart explaining a flow of ROI mask updating processing.

In Step S164, the ROI mask updating portion 105 ends the ROI mask updating processing shown in FIG. 16. Also, the operation of the ROI detecting apparatus 100 is returned back to the processing in Step S105 shown in FIG. 13. Then, the predetermined pieces of processing in and after the processing in Step S106 are executed.

In the manner as described above, the ROI detecting apparatus 100 more precisely generates the ROI mask in the hierarchical processing. By adopting such a procedure, the ROI detecting apparatus 100 can generate the more precise ROI mask at the high speed and with the low load without requiring the complicated arithmetic operation processing. Therefore, the ROI detecting apparatus 100 can suppress the increase in cost as well.

In a word, the ROI detecting apparatus 100 can more readily analyze the features of the image.

[Examples of Use of ROI Mask]

The ROI mask generated in the manner as described above can be used in various pieces of image processing. For example, when the input image is subjected to the compression encoding in accordance with the JPEG encoding system, the ROI mask may be used.

In the utilization in the compression encoding complying with the JPEG encoding system, unlike the moving image compression, it may be impossible to control the quantization parameter within the image. In order to cope with this situation, it is thought that by utilizing the ROI mask, the filtering processing is executed only for the portion in which the cell does not exist (blank region) to reduce an amount of bits. As a result, the encoding efficiency can be enhanced (in such a way that the image quality deterioration is inconspicuous) without increasing a visual influence.

It is noted that in this case, the block size is preferably set to pixels of 8×8 as an orthogonal transformation processing unit in the JPEG encoding system. In addition, for "the protection region," "the cell region" is preferably uniformly expanded (the safer setting is preferably carried out) in such a way that the filtering does not influence "the cell region" as the region of interest. In addition, since it may be impossible to carry out the fine quantization control as described above, the generation and synthesis of the edge mask may be omitted.

In addition, the ROI mask, for example, may be utilized when the input image is subjected to the compression encoding in accordance with either the MPEG encoding system or the AVC (Advanced Video Coding) encoding system.

In the case of the moving image compression system such as the MPEG encoding system or the AVC encoding system, the quantization parameter can be controlled every macro-block. Thus, in the case, the block size is preferably set to (16×16) pixels so as to correspond to the macro-block size. In addition, partial expansion is preferably carried out for "the protection region." In this case, in the partial expansion, only "the blank region" surrounded by the circumferential blocks most of which are "the cell regions" is set as "the protection region." In addition, since the fine quantization control can be carried out, the edge mask is also preferably generated with which the ROI mask is synthesized.

In the moving image compression, there is possible the fine quantization control such that the quantization parameter is set high with the focused region as a center, the quantization parameter is changed step by step, and so forth. Therefore, the enhancement of the encoding efficiency is further expected.

As has been described, by utilizing the ROI mask, the compression ratio can be controlled every partial region. As a result, the encoding efficiency can be enhanced in such a way that the image quality deterioration is inconspicuous. In addition, the proper use of the weighting owing to the ROI mask can be readily carried out in accordance with the compression method.

In addition, the ROI mask can also be utilized for the noise reduction filter processing, the setting of the strength of the filter, or the like in the phase of the photographing, and the like. In addition, since the focused position can be indicated by the ROI level, the ROI mask, for example, can also be utilized for the control of guidance to the focused position in the viewer or the like.

It is noted that when the ROI detection as described above is used in the observation image in the cell diagnosis having the Z stack, the following procedure may also be adopted in order to increase the safety. That is to say, the ROI masks detected in the layers (the images which are different in focal point position from one another) of the Z stack may be stacked one upon another, and the portion which is determined to be the cell once is adapted to be protected in the Z-direction.

In a word, the ROI masks are synthesized with one another among the layers. For example, when the ROI levels different from one another are set with respect to the blocks identical to one another in the ROI masks, the highest ROI level among the different ROI levels is adopted. As a result, it is possible to suppress the detection omission of the region of interest due to the missing of the focal point or the like.

Of course, the ROI level of one block may be changed every layer without carrying out such synthesis.

In a word, the ROI detecting apparatus 100 can carry out more readily the feature analysis which can be utilized for the various pieces of image processing or can generate ROI mask.

2. Application Example

Personal Computer

The series of processing described above either can be executed by hardware or can be executed by software. In this case, for example, a section for executing the series of processing may be configured in the form of a personal computer as shown in FIG. 17.

In FIG. 17, a Central Processing Unit (CPU) 301 of the personal computer 300 executes various pieces of processing in accordance with either a program stored in a Read Only Memory (ROM) 302, or a program loaded from a memory portion 313 into a Random Access Memory (RAM) 303. Data and the like necessary for the CPU 301 to execute the various pieces of processing are also suitably stored in the RAM 303.

The CPU 301, the ROM 302, and the RAM 303 are connected to one another through a bus 304. The I/O interface 310 is also connected to the bus 304.

An inputting portion 311, an outputting portion 312, a memory portion 313, and a communicating portion 314 are connected to the I/O interface 310. In this case, the inputting portion 311 is composed of a keyboard, a mouse or the like. The outputting portion 312 is composed of a display device such as a Cathode Ray Tube (CRT) or a Liquid Crystal Display (LCD) device, a speaker, and the like. The memory portion 313 is composed of a hard disc or the like. Also, the communicating portion 314 is composed of a modem or the like. The communicating portion 314 executes communicating processing through a network including the Internet.

A drive 315 is connected to the I/O interface 310 as may be necessary. Also, the I/O interface 310 is suitably equipped with a removable media 321 such as a magnetic disc, an optical disc, a magneto optical disc, or a semiconductor memory. Also, a computer program read out from the removable media 321 is installed in the memory portion 313 as may be necessary.

When the series of processing described above are executed by the software, a program composing the software is installed from the network or the recording medium in the personal computer 300.

That recording medium, for example, as shown in FIG. 17, is composed of the removable media 321 such as a magnetic disc (including a flexible disc), an optical disc (including a Compact Disc-Read Only Memory (CD-ROM), or a Digital Versatile Disc (DVD)), a magneto optical disc (including a Mini Disc (MD)) or a semiconductor memory in which a program distributed in order to be delivered to a user is recorded separately from the main body of the personal computer 300. In addition thereto, that recording medium is composed of a hard disc or the like included in the ROM 302 or the memory portion 313 in which the program which is delivered to the user in a state of being previously incorporated in the main body of the personal computer 300 is recorded.

It is noted that the program which the computer executes either may be a program in accordance with predetermined pieces of processing are executed in a time series manner along the order described in this specification, or may be a program in accordance with which the predetermined pieces of processing are executed in parallel or at a necessary timing such as when a call is made.

In addition, in this specification, steps in which the program recorded in the recording medium are described include predetermined pieces of processing which are not necessarily processed in a time series manner, but are executed in parallel or individually as well as predetermined pieces of processing which are executed in a time series manner along the described order.

In addition, in this specification, the system means the entire apparatus composed of plural devices (units).

In addition, in the foregoing, a configuration described as one unit (or a processing portion) may be divided to be configured as plural units (or plural processing portions). Contrary to this, in the foregoing, configurations described as plural units (or plural processing portions) may be collectively configured as one unit (or a processing portion). In addition, of course, a configuration other than the configurations described above may also be added to configurations of units (or processing portions). Moreover, a part of a configuration of a certain unit (or a certain processing portion) may also be included in configurations of other units (or other processing portions) as long as the configurations and the operations are substantially identical in terms of the entire system. In a word, embodiments of the present disclosure are by no means limited to the embodiment described above, and various changed can be made without departing from the subject matter of the present disclosure.

What is claimed is:

1. An image processing apparatus, comprising:
   a reducing section reducing an image for which a feature analysis is to be carried out at a predetermined reduction ratio;
   an ROI mask generating section analyzing a feature of a reduced image as the image reduced at the predetermined reduction ratio by said reducing section, and generating an ROI mask as mask information indicating a region of interest as a region to be interested in the reduced image;
   an ROI mask enlarging section enlarging a size of said ROI mask generated by said ROI mask generating section to a size of the image before being reduced at the predetermined reduction ratio by said reducing section; and
   an ROI mask updating section analyzing a feature of a region, set as a blank region as a region not to be interested in said ROI mask, of the image before being reduced at the predetermined reduction ratio by said reducing section, and updating said ROI mask by using an analysis result;
   ROI standing for region of interest.

2. The image processing apparatus according to claim 1, wherein said ROI mask generating section obtains a dispersion of pixel values every partial region having a predetermined size for the reduced image, and determines a degree of interest of the partial region in accordance with a size of a value of the dispersion, thereby generating said ROI mask.

3. The image processing apparatus according to claim 2, wherein said ROI mask generating section sets the partial region in which the value of the dispersion is equal to or larger than 1 as the region of interest.

4. The image processing apparatus according to claim 3, wherein said ROI mask generating section sets the partial region in which the value of the dispersion is equal to or larger than 2 as the region of interest which is higher in degree of interest than the partial region in which the value of the dispersion is 1.

5. The image processing apparatus according to claim 1, wherein said ROI mask updating section obtains a dispersion of pixel values every partial region having a predetermined size for the region set as the blank region of the image, and determines a degree of interest of the partial region in accordance with a size of a value of the dispersion, thereby updating the blank region of said ROI mask.

6. The image processing apparatus according to claim 5, wherein said ROI mask updating section sets the partial region in which the value of the dispersion is equal to or larger than 2 as the region of interest.

7. The image processing apparatus according to claim 1, further comprising:
   an expanding section expanding the region of interest of said ROI mask generated by said ROI mask generating section.

8. The image processing apparatus according to claim 1, further comprising:
   an expanding section expanding the region of interest of said ROI mask generated by said ROI mask updating section.

9. The image processing apparatus according to claim 1, further comprising:
   an edge component detecting section detecting an edge component of the image;
   an edge mask generating section generating an edge mask as mask information in which a region containing therein the edge component detected by said edge component detecting section is set as the region of interest; and
   a mask synthesizing section synthesizing said ROI mask updated by said ROI mask updating section with said edge mask.

10. An image processing method for use in an image processing apparatus, comprising:
    reducing an image for which a feature analysis is to be carried out at a predetermined reduction ratio by a reducing section;
    analyzing a feature of a reduced image as the image reduced at the predetermined reduction ratio by said reducing section, and generating an ROI mask as mask information indicating a region of interest as a region to be interested in the reduced image by an ROI mask generating section;
    enlarging a size of said ROI mask generated by said ROI mask generating section to a size of the image before being reduced at the predetermined reduction ratio by an ROI mask enlarging section; and
    analyzing a feature of a region, set as a blank region as an area not to be interested in said ROI mask, of the image before being reduced at the predetermined reduction ratio, and updating said ROI mask by using an analysis result by an ROI mask updating section;
    ROI standing for region of interest.

* * * * *